United States Patent
Zeidler

(10) Patent No.: US 8,612,125 B2
(45) Date of Patent: Dec. 17, 2013

(54) METHOD AND DEVICE FOR ACQUIRING AND TRANSMITTING OPERATING DATA OF AN INTERNAL COMBUSTION ENGINE

(75) Inventor: Johannes Zeidler, Backnang (DE)

(73) Assignee: Robert Bosch GmbH, Stuttgart (DE)

( * ) Notice: Subject to any disclaimer, the term of this patent is extended or adjusted under 35 U.S.C. 154(b) by 147 days.

(21) Appl. No.: 13/148,006

(22) PCT Filed: Jan. 5, 2010

(86) PCT No.: PCT/EP2010/050031
§ 371 (c)(1),
(2), (4) Date: Oct. 18, 2011

(87) PCT Pub. No.: WO2010/091903
PCT Pub. Date: Aug. 19, 2010

(65) Prior Publication Data
US 2012/0035838 A1    Feb. 9, 2012

(30) Foreign Application Priority Data

Feb. 16, 2009  (DE) .................. 10 2009 000 871

(51) Int. Cl.
*G01M 15/02*    (2006.01)

(52) U.S. Cl.
USPC .......... 701/114; 701/115; 73/114.01; 702/183

(58) Field of Classification Search
USPC ........ 701/114, 115; 73/114.01; 702/182, 183, 702/187
See application file for complete search history.

(56) References Cited

U.S. PATENT DOCUMENTS

| | | | | |
|---|---|---|---|---|
| 4,270,174 A * | 5/1981 | Karlin et al. | ................. | 701/115 |
| 4,326,410 A | 4/1982 | Bukhtiyarov et al. | | |
| 5,638,273 A * | 6/1997 | Coiner et al. | ................. | 701/33.4 |
| 5,948,026 A * | 9/1999 | Beemer et al. | ................. | 701/33.4 |
| 5,964,813 A * | 10/1999 | Ishii et al. | ................. | 701/29.2 |
| 6,601,015 B1 * | 7/2003 | Milvert et al. | ................. | 702/182 |
| 8,412,405 B2 * | 4/2013 | Enomoto et al. | ............. | 701/32.3 |
| 2003/0200022 A1 * | 10/2003 | Streichsbier et al. | ......... | 701/108 |
| 2008/0082228 A1 | 4/2008 | Massen et al. | | |
| 2008/0082250 A1 * | 4/2008 | Husted et al. | ................. | 701/115 |

FOREIGN PATENT DOCUMENTS

| | | |
|---|---|---|
| DE | 3020890 | 12/1981 |
| JP | 9-62338 | 3/1997 |
| JP | 2001-242929 | 9/2001 |
| WO | WO 2006105930 | 10/2006 |

OTHER PUBLICATIONS

International Search Report, PCT International Patent Application No. PCT/EP2010/050031, dated Apr. 20, 2010.

* cited by examiner

*Primary Examiner* — Erick Solis
(74) *Attorney, Agent, or Firm* — Kenyon & Kenyon LLP

(57) ABSTRACT

A method for acquiring operating data of an internal combustion engine in a control unit during a diagnostic function of the control unit, and for transmitting the operating data from the control unit to a diagnostics device, the operating data being determined in the control unit with the aid of sensors assigned to the internal combustion engine. Desired operating data type and time resolution of the value reception is transmitted from the diagnostic device. Operating data are collected in the control unit with the aid of a diagnostic function. The diagnostics device and the control unit are connected via standardized interfaces, whose transmission speed is limited. Data values are buffered in a memory in the control unit. Speed of data acquisition may be selected independently of the transmission speed of the interface between the control unit and the diagnostics device. Data acquisition synchronous with the rotational speed is possible.

12 Claims, 1 Drawing Sheet

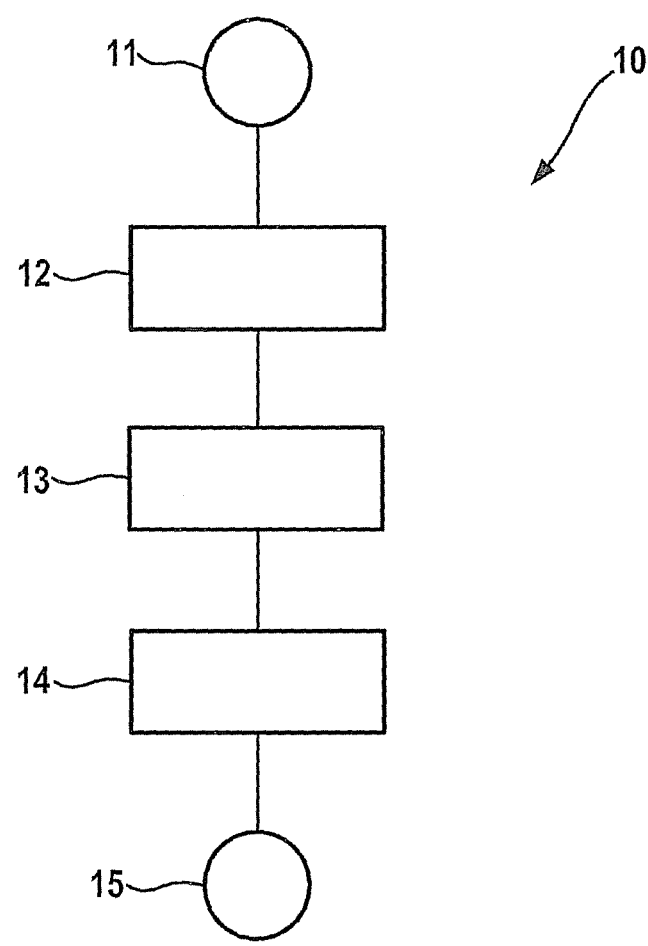

METHOD AND DEVICE FOR ACQUIRING AND TRANSMITTING OPERATING DATA OF AN INTERNAL COMBUSTION ENGINE

FIELD OF THE INVENTION

The present invention relates to a method for acquiring operating data of an internal combustion engine in a control unit during a diagnostic function of the control unit, and for transmitting the operating data from the control unit to a diagnostics device, the operating data being determined in the control unit with the aid of sensors assigned to the internal combustion engine and/or variables derived from output signals of the sensors and/or from control unit-internal variables.

In addition, the present invention relates to a device for acquiring operating data of an internal combustion engine in a control unit provided for controlling the internal combustion engine during a diagnostic function of the control unit, and for transmitting the operating data from the control unit to a diagnostics device connected to the control unit, sensors for acquiring the operating data being assigned to the control unit and/or functions being provided in the control unit which are intended for deriving operating data from the output signals of the sensors, and a diagnostic function being provided in the control unit.

BACKGROUND INFORMATION

Control units for internal combustion engines acquire signals from sensors such as lambda sensors, temperature sensors, a mass airflow sensor, angle of rotation sensors, cylinder pressure sensors, knock sensors and driver's intent sensors, process them, and control actuators on the internal combustion engine such as fuel metering devices, electrical ignition devices, and an air supply metering device. The objective is to make power of the internal combustion engine available according to the driver's intent. But an additional role of the control unit is to achieve correct functioning of the internal combustion engine in regard to low-emission combustion, and when necessary to provide diagnostic data which permit controlling the function of the internal combustion engine. The functions of the control unit may be implemented as an electronic circuit or as a program sequence, or as a combination of the two.

To control the function of an internal combustion engine, it is customary to connect the controller via a standardized interface to an external test device, a so-called diagnostic tester or diagnostics device, via which data may be sent to the control unit in order to set operating conditions of the internal combustion engine selectively, and via which data may be read out from the control unit, processed and displayed. This makes it possible to perform a comprehensive test of the functions of the internal combustion engine, the control unit, the connected sensors, and the actuators during a stop in the repair shop.

During such a checkup, the external test device sends a query for a particular type of value to the control unit, which returns the actual value of the value type. For example, the actual value of the signal of a lambda sensor may be queried in this way. If multiple time-sequential values are needed, a query is sent to the external test device for each value to be transmitted. The method described results in a minimum cycle time, which is one of the factors determined by the data exchange between the test device and the control unit and which limits the maximum frequency of the queries. Furthermore, the cycle time is not necessarily constant, so that periodic queries, for example queries coupled with the rotational speed of the internal combustion engine, are exacerbated.

U.S. Pat. No. 6,601,015 B1 describes a method an internal combustion engine having a number of cyclically moving pistons for driving a land vehicle and a control unit having data memories for the internal combustion engine, the controller controlling the internal combustion engine by periodically monitoring a number of performance parameters, a first starting event being established at which a first number of values which represent at least part of the performance parameters of the internal combustion engine are stored in the memory at a first predefined frequency, and a second starting event being established at which a second number of values are stored in the memory at a second predefined frequency, the values representing at least part of the performance parameters of the internal combustion engine, and the first predefined frequency being settable by the first starting event, the second predefined frequency being settable by the second starting event, and the first and second frequencies may be predefined differently.

SUMMARY

An object of the present invention is to provide a method which permits values characterizing the operating condition of the internal combustion engine to be acquired during a diagnostic phase in a predefined time pattern having a high sampling rate and/or synchronously with the rotational speed of the internal combustion engine, and to transmit these values to a diagnostics device. A further object of the present invention is to provide a device for carrying out the method.

In accordance with example embodiments of the present invention, the method may be achieved in that a specification of an operating data type and a temporal resolution of the value acquisition are transmitted from the diagnostics device to the diagnostic function, that the operating data are collected in the control unit with the aid of the diagnostic function, that the value acquisition is started by the diagnostics device, that the operating data are stored in a buffer memory in the control unit, and that the operating data are transmitted from the buffer memory to the diagnostics device.

To determine operating data of an internal combustion engine under various operating conditions, it is customary to connect the control unit of the internal combustion engine to an external diagnostics device, which is able on the one hand to transmit the parameters of the operating conditions to the control unit, and on the other hand to read operating data of the internal combustion engine from the control unit. The diagnostics device and the control unit are connected via standardized interfaces, whose transmission speed is limited for reasons of cost and security from interference. Due to the configuration of the diagnostic function in the example control unit according to the present invention, which may be designed as a circuit and/or a program sequence, not every operating data value is retrieved individually from the diagnostics device, but rather a series of operating data values are buffered in a buffer memory in the control unit, the acquisition of data is not limited by the speed of the data transfer between the diagnostics device and the control unit, but only by the internal structure of the control unit. Furthermore, the data traffic sent and received by the diagnostics device is reduced significantly, so that the available data rate may be used for transporting operating data, and a smaller proportion of administrative data must be transmitted than according to the related art.

An example method according to the present invention enables the speed of data acquisition to be selected independently of the transmission speed of the interface between the control unit and the diagnostics device, and thus in particular it may also be higher. Due to the high speed of data acquisition, it is also possible to collect several types of operating data values in parallel, such as a lambda value, an air quantity value, and an exhaust gas temperature value, and thus to obtain a more exact picture of the time pattern of the operating condition of the internal combustion engine. Data acquisition at a rate of 100 individual data items per second is possible using the method, even for several types of operating data in parallel, and data acquisition synchronous with the rotational speed is also attainable. This independence of the speed of data acquisition from the transfer of data between the control unit and the diagnostics device has the additional advantage that the data are able to be acquired at precisely predefinable time intervals; a time shift due to delays of the query from the diagnostics device or the moment of transmission from the control unit cannot occur. It may also be provided that the time interval of data acquisition is established in the control unit, in order, for example, to attain data acquisition synchronous with the rotational speed. The driving operation is not affected, since the diagnostic function is activated only when the diagnostics device is connected.

A selective test of various operating conditions, including in particular to optimize the operating behavior of the internal combustion engine and to search for errors, is made possible by selectively predefining parameters of the internal combustion engine with the aid of the diagnostics device while operating data are being acquired. In one specific embodiment, it may be provided that the parameter shifting is time-synchronized with the acquisition of operating data. It may be provided that operating parameters of the internal combustion engine are varied within a predefinable range while data are being acquired. Optimization and error search are simplified by the ability to choose the period of data acquisition freely within broad limits; it is not disturbed by transmission and acquisition of data. A non-periodic data acquisition may also be provided, which is specified with the aid of inputs at the diagnostics device. There is an advantage in the higher data rate attainable using the method, which allows faster error search and optimization, and which makes it possible for the first time to analyze load alteration processes.

The flexibility of acquisition of operating data of the internal combustion engine is increased by the fact that the beginning of data acquisition may be established in a variety of ways, by having the diagnostic function started by the diagnostics device, or by having a starting point in time or a length of delay between a starting signal from the diagnostics device and the starting time of the diagnostic function transmitted to the control unit by the diagnostics device. The diagnostic function may also be designed in such a way that a starting condition, such as overshooting or undershooting of a value in the control unit, may be established by the diagnostics device.

The length of the phase of operating data acquisition may be established by having the diagnostics device transmit to the control unit the number of items of operating data to be acquired, since this number together with the temporal resolution of the data collection establishes the total duration. By specifying the number of data items to be acquired it also makes it possible to use the memory available in the control unit optimally, and it is possible to forgo a function which overwrites the first data acquired when the limit of the available memory area is reached ("rolling buffer"). Eliminating the "rolling buffer" enables clear time assignment of the operating data in reference to the starting time of a test series.

A high data acquisition speed and separation of data acquisition and data transmission are achieved by the fact that the operating data are transmitted from the control unit to the diagnostics device after the acquisition of the operating data is concluded. This separation enables the operating data to be received in the buffer memory at the intended data rate and to be transmitted subsequently as a block, which reduces the transmission time. The output of the operating data may begin at a command from the diagnostics device, or automatically after the test is concluded. It may also be provided that the data transmission begins when the buffer memory is full.

A particularly efficient use of a memory present in the control unit provides that program sequences are stored in the memory in the control unit, and that operating data from diagnostic functions are stored in one part of the memory as a buffer memory. In a workshop operation, or when optimizing the internal combustion engine on a test stand, a volatile memory present in the control unit which is intended for diagnostic functions may be used; in that case no additional non-volatile memory is needed for storing the operating data. The approach according to the present invention is therefore particularly easy and cost-effectively implementable.

The object with regard to the example device may be achieved by providing a buffer memory in the control unit for storing the operating data, and by designing the diagnostic function for acquiring and storing data in the buffer memory at high time resolution. The diagnostic function may be implemented in this case as a circuit and/or a program sequence in the control unit. It enables the acquisition of the operating data to be kept separate from its transmission to the diagnostics device, and thus eliminates time limitations of data acquisition due to the speed of data transmission between the control unit and the diagnostics device. According to the present invention, each value of operating data is not requested and transmitted individually by the diagnostics device, but rather a test series is specified, whose results are transmitted as a block from the control unit to the diagnostics device. In this case the possibility is included of generating operating data from the output data of the sensors assigned to the internal combustion engine through calculations, and of determining operating data from combinations of data present in the control unit and output data from the sensors.

If a timer is provided in the control unit in the form of a program sequence or circuit, the decoupling of data reception and data transmission according to the present invention may be used to determine and store the data in the control unit at predefinable time intervals. The timer may be designed to be programmable, so that the time interval is established in the diagnostics device and may be transmitted to the timer in the control unit. The timer may also be designed in such a way that various time functions are transmitted from the diagnostics device to the timer and processed by the timer.

BRIEF DESCRIPTION OF THE DRAWING

The present invention is explained below on the basis of an exemplary embodiment shown in the FIGURE.

DETAILED DESCRIPTION OF EXAMPLE EMBODIMENTS

FIG. 1 shows a flow chart for the acquisition of operating data of an internal combustion engine.

FIG. 1 shows a flow chart 10 for the acquisition of operating data of an internal combustion engine in a control unit of the internal combustion engine, as well as for transmission thereof to a diagnostics device. After a start 11, an external test device, a so-called diagnostic tester, transmits according to the present invention, in a data specification 12, a piece of information to the control unit of the internal combustion engine as to what type of operating data of the internal combustion engine is to be acquired and stored. In addition, the external test device transmits in data specification 12 the information about the time intervals at which the data should be acquired. In a data recording 13, the control unit records the operating data and writes them to a memory area in the control unit. In a data transmission 14, the operating data are transmitted from the memory area in the control unit to the external diagnostics device. Here the operating data may be displayed graphically and evaluated. The sequence according to the present invention is concluded with an end 15.

What is claimed is:

1. A method for acquiring operating data of an internal combustion engine in a control unit during a diagnostic function of the control unit, and for transmitting the operating data from the control unit to a diagnostics device, comprising:
   determining the operating data in the control unit using at least one of sensors assigned to the internal combustion engine, variables derived from output signals of the sensors, and control unit-internal variables;
   configuring the diagnostic function by transmitting a specification of an operating data type and of a temporal resolution of the acquisition of the operating data from the diagnostics device to the diagnostic function;
   acquiring the operating data in the control unit using the diagnostic function;
   starting the acquisition by the diagnostics device;
   storing the operating data in a buffer memory in the control unit; and
   transmitting the operating data from the buffer memory to the diagnostics device;
   wherein during the acquisition of the operating data, operating parameters of the internal combustion engine are set by the diagnostics device so that the acquired operating data reflects operation of the internal combustion engine under the set parameters.

2. The method as recited in claim 1, wherein one of the diagnostic function is started by the diagnostics device, or a starting time or a length of delay between a starting signal from the diagnostics device and the starting time of the diagnostic function is transmitted from the diagnostics device to the control unit.

3. The method as recited in one of claim 1, wherein a number of items of operating data to be acquired is transmitted from the diagnostics device to the control unit.

4. The method as recited in claim 1, wherein the operating data is transmitted from the control unit to the diagnostics device after reception of the operating data is concluded.

5. The method as recited in claim 1, wherein program sequences for diagnostic functions are stored in a memory in the control unit, and operating data from diagnostic functions are stored in one part of the memory as a buffer memory.

6. The method as recited in claim 1, wherein the setting of the operating parameters involves switching the operating parameters in synchronization with the acquisition of the operating data.

7. The method as recited in claim 3, wherein the number of items of the operating data is selected to prevent stored operating data from being overwritten in the buffer memory.

8. A device for receiving operating data from a control unit of an internal combustion engine, the operating data corresponding to at least one of output signals of sensors assigned to the internal combustion engine, variables derived from the output signals of the sensors, and internal variables of the control unit, the device comprising:
   circuitry configured to:
      transmit to the control unit a specification of an operating data type and of a temporal resolution of the acquisition of the operating data;
      start the acquisition of the operating data;
      receive the operating data from a buffer memory of the control unit; and
      during the acquisition of operating data, set operating parameters of the internal combustion engine so that the acquired operating data reflects operation of the internal combustion engine under the set parameters.

9. The device as recited in claim 8, wherein the setting of the operating parameters involves switching the operating parameters in synchronization with the acquisition of the operating data.

10. The device as recited in claim 9, wherein a timer in the form of one of a program sequence or circuit is provided in the control unit, the timer controlling a timing with which the operating data is acquired.

11. The device as recited in claim 8, wherein the circuitry is configured to transmit a number of items of operating data to be acquired to the control unit.

12. The device as recited in claim 11, wherein the number of items of the operating data is selected to prevent stored operating data from being overwritten in the buffer memory.

* * * * *

UNITED STATES PATENT AND TRADEMARK OFFICE
CERTIFICATE OF CORRECTION

PATENT NO. : 8,612,125 B2 Page 1 of 1
APPLICATION NO. : 13/148006
DATED : December 17, 2013
INVENTOR(S) : Johannes Zeidler It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 210 days.

Signed and Sealed this
Twenty-second Day of September, 2015

Michelle K. Lee
*Director of the United States Patent and Trademark Office*